US009760857B2

(12) United States Patent
Argue et al.

(10) Patent No.: US 9,760,857 B2
(45) Date of Patent: *Sep. 12, 2017

(54) TECHNIQUES FOR DETECTING DEPLETED STOCK

(71) Applicant: Wal-Mart Stores, Inc., Bentonville, AR (US)

(72) Inventors: Stuart Argue, Bentonville, AR (US); Anthony Emile Marcar, Bentonville, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/637,079

(22) Filed: Mar. 3, 2015

(65) Prior Publication Data

US 2015/0220878 A1 Aug. 6, 2015

Related U.S. Application Data

(63) Continuation of application No. 13/730,300, filed on Dec. 28, 2012, now Pat. No. 8,996,413.

(51) Int. Cl.
*G06Q 10/08* (2012.01)
*H04N 5/225* (2006.01)
*G06K 9/00* (2006.01)
*G06K 9/62* (2006.01)
*G06K 9/78* (2006.01)

(52) U.S. Cl.
CPC ....... *G06Q 10/087* (2013.01); *G06K 9/00711* (2013.01); *G06K 9/6215* (2013.01); *G06K 9/78* (2013.01); *H04N 5/225* (2013.01)

(58) Field of Classification Search
None
See application file for complete search history.

(56) References Cited

U.S. PATENT DOCUMENTS

| 8,325,036 B1* | 12/2012 | Fuhr | G06Q 10/087 340/5.92 |
| 2014/0003727 A1* | 1/2014 | Lortz | G06Q 10/087 382/218 |

* cited by examiner

*Primary Examiner* — Ryan Zeender
*Assistant Examiner* — Denisse Ortiz Roman
(74) *Attorney, Agent, or Firm* — Bryan Cave LLP

(57) ABSTRACT

A computer-implemented method is disclosed herein. The method includes the step of receiving, at a processing device of a commerce server, at least a video signal from a head mountable unit worn by a consumer in a retail store. The method also includes the step of identifying, with the processing device, an indication of depleted stock in the retail store in response to the video signal received from the head mountable unit. The method also includes the step of transmitting, with the processing device, a restock signal in response to the identifying step.

19 Claims, 6 Drawing Sheets

TECHNIQUES FOR DETECTING DEPLETED STOCK

CROSS REFERENCE TO RELATED APPLICATIONS

This application is a continuation of U.S. Non-Provisional application Ser. No. 13/730,300 titled TECHNIQUES FOR DETECTING DEPLETED STOCK, filed Dec. 28, 2012, the entirety of which is incorporated herein by reference.

TECHNICAL FIELD

The present invention relates generally to maintaining a stock of products on store shelf. In particular, examples of the present invention are related to techniques for detecting when a store shelf has become empty.

BACKGROUND OF THE DISCLOSURE

Retail stores can extend across thousands of square feet and offer many thousands of distinct products. Attempts can be made to conduct some restocking during peak sales hours as products are removed from shelves. Large-scale restocking can be accomplished during hours of relatively low customer traffic, such as after midnight. Despite regular restocking schedules, store shelves can become fully depleted of one or more products resulting in a decrease in customer satisfaction. When this occurs, it is possible that a consumer looking for a depleted product will end shopping in order to search for that product at another retail store. In addition, it is possible that the consumer will forego making any purchases based on dissatisfaction over the depleted product.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
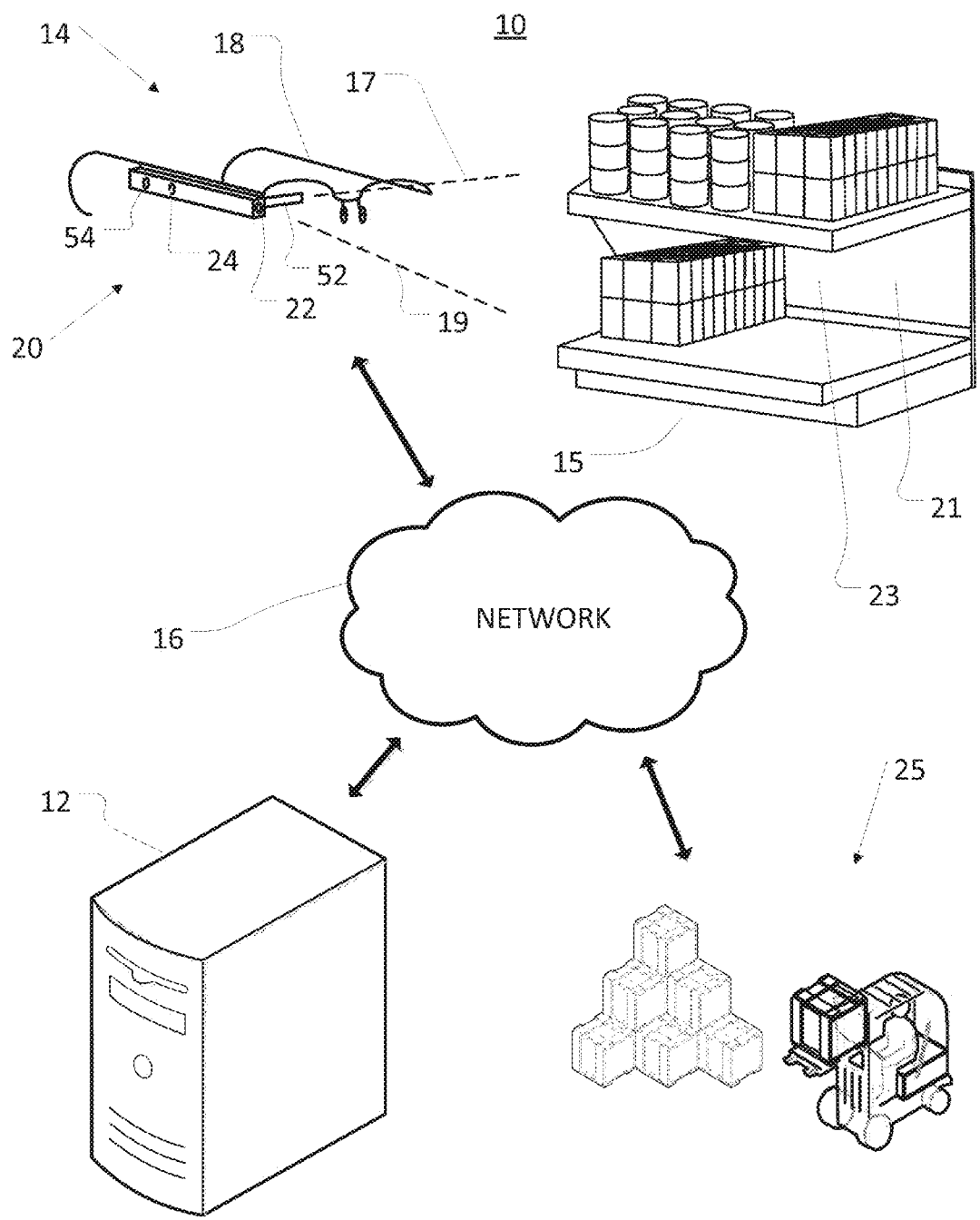
FIG. 1 is an example schematic illustrating a system according to some embodiments of the present disclosure.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION OF THE DISCLOSURE

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Embodiments of the present disclosure can assist in detecting a depleted stock of a product in a retail store. A system according to some embodiments of the disclosure can include a commerce server receiving signals from an electronic device such as a head mountable unit worn by a consumer. The head mountable unit can transmit one or more signals containing data as the consumer shops. The one or more signals can contain data that indicates a depletion of one or more products offered for sale in the retail store.

In some embodiments of the present disclosure, the signal received by the commerce server can be a video signal in which a fully or partially empty shelf is visible. For example, the video signal can contain a white space between two quantities of products. A "white space" can be portion of an image frame in which nothing appears. The white space can be recognized as an indication of depleted stock of a product. In some embodiments, the video signal can contain a pattern other than white space that is recognized as an indication of depleted stock of a product. For example, the rear wall of shelving units in the retail store can define a pattern such as a lattice. In some embodiments of the present disclosure, detection of the lattice pattern in the video signal can indicate to the commerce server that the condition of depleted stock of a product exists.

In some embodiments of the present disclosure, the system can transmit a restock signal in response to the detection of depleted stock of a product. In some embodiments of the present disclosure, the supply of product in the retail store can be less than fully exhausted when an exemplary system determines that stock is depleted and a restock signal is transmitted.

In some embodiments of the present disclosure, the head mountable unit can transmit more than one signal received by the commerce server. The location of depleted stock can be correlated with the indication of depleted stock through one or more signals. For example, the indication of depleted stock can be determined by a video signal. In some embodiments, the location of the depletion can be at least partially determined by a position signal transmitted by the head mountable unit. The position of the head mountable unit in the retail store can indicate that the stock of a product proximate to the head mountable unit is depleted. Also, tracking could be executed by a tracking system in the store and sent to the head mountable unit.

The commerce server can include a product database containing the identities and locations of products offered for sale in the retail store. The position of the head mountable unit in the retail store when the indication of depleted stock is identified can be correlated to the data in the product database. The restock signal can contain the location within the retail store that should be investigated for depleted stock.

In some embodiments of the present disclosure, the identity of the product can be at least partially determined by correlating one or more signals with the indication of depleted stock. For example, the identity of the product of depleted stock can be at least partially determined by the position signal and a direction signal transmitted by the head mountable unit. The direction of the consumer can be contained in the direction signal emitted by the head mountable unit and received by the commerce server. The data in the direction signal and in the position signal can be correlated to data in the product database to narrow the field of possible products that is depleted. This correlation can significantly narrow the set of possible products from all of the products offered for sale in the retail store to only the products proximate to the head mountable unit and, further, only products in the forward direction of the consumer. The direction could also be determined using GPS or an in-store tracking system. Other data, such as video or a gyroscope, could be used.

In some embodiments of the present disclosure, the identity of the product can be determined by also correlating an orientation signal with the indication of depleted stock. For example, the identity of the product of depleted stock can be at least partially determined by the position signal, the direction signal, and an orientation signal transmitted by the head mountable unit. The orientation of the consumer's head can be contained in the orientation signal emitted by the head mountable unit and received by the commerce server. The data in the orientation signal, the direction signal, and the position signal can be correlated to data in the product database to narrow the field of possible products that is depleted. The orientation signal can indicate that the consumer is viewing a low shelf, a middle shelf, or a high shelf. The video signal corresponds to the orientation of the consumer's head. This correlation can significantly narrow the set of possible products that is depleted from all the products offered for sale in the retail store to only products proximate to the head mountable unit, only products in the forward direction of the consumer, and only products on a particular shelf.

In some embodiments, the identity of the depleted product can be determined by the video signal. For example, the commerce server can analyze the video signal to identify a bar code below white space detected in the video signal. In some embodiments, the commerce server can analyze the video signal to identify a quick response code. For example, a quick response code can be disposed on the rear wall of shelves in the retail store and each a particular quick response code can be associated with each product in the retail store. Detection of the quick response code can indicate both the existence of a depletion of stock and the identity of the depleted product.

To illustrate, FIG. 1 is a schematic illustrating a depletion detection system 10 according to some embodiments of the present disclosure. The depletion detection system 10 can implement a computer-implemented method that includes the step of receiving, at a processing device of a commerce server 12, one or more signals from a head mountable unit 14. The head mountable unit 14 can be worn by a consumer while moving within a retail store. In the illustrated embodiment of FIG. 1, the exemplary head mountable unit 14 includes a frame 18 and a communications unit 20 supported on the frame 18.

A video signal can be transmitted from the head mountable unit 14 in which a portion of store shelving 15 is in the field of view of a camera 22 of the head mountable unit 14. It is noted that embodiments of the present disclosure can be practiced in retail stores not using shelving and in retail stores partially using shelving. The field of view of a camera 22 is illustrated schematically by dashed lines 17 and 19. The dashed lines 17 and 19 represent edges of the field of view.

In some embodiments, the camera 22 can capture images of products on the shelving 15. White spaces in the video signal can be defined by gaps between products arising when stock is depleted. The location of an exemplary white space is referenced at 23. A rear wall 21 of the shelving 15 can also be detectable in the video signal. If a white space 23 is detected, the commerce server can transmit a restock signal to a restock facility 25 operable to restock the shelving 15. The restock facility 25 can be remote from the retail store or can be a portion of the retail store.

The one or more signals transmitted by the head mountable unit 14 and received by the commerce server 12 can be transmitted through a network 16. As used herein, the term "network" can include, but is not limited to, a Local Area Network (LAN), a Metropolitan Area Network (MAN), a Wide Area Network (WAN), the Internet, or combinations thereof. The restock signal transmitted by the commerce server 12 and received by the restock facility 25 can also be transmitted over the network 16.

Figure 2:
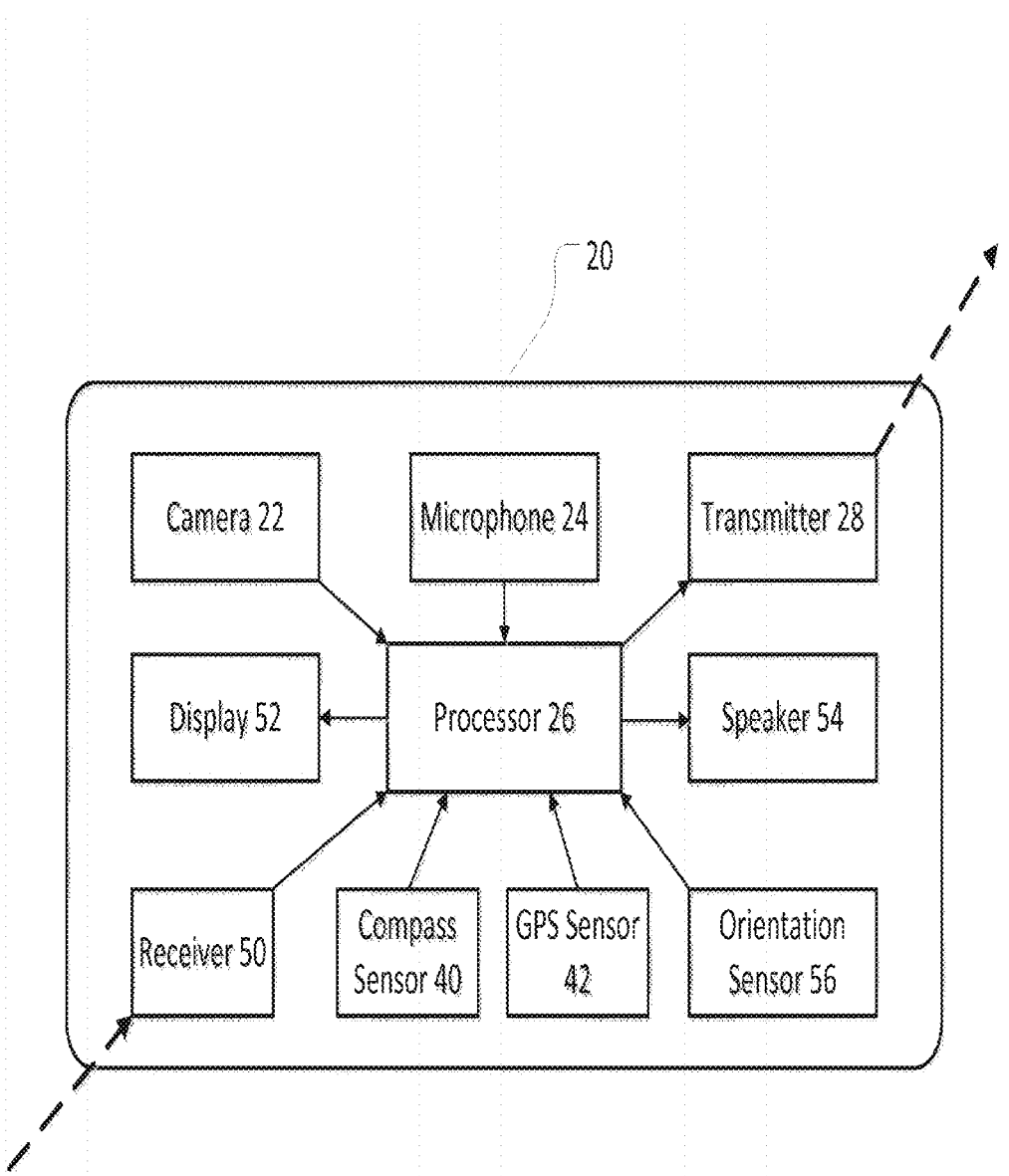
FIG. 2 is an example block diagram illustrating a head mountable unit that can be applied in some embodiments of the present disclosure.

Referring now to FIG. 2, a block diagram illustrating exemplary components of the communications unit 20 includes the camera 22 configured to generate a video signal that corresponds to the field of view of the consumer wearing the head mountable unit 14. The video signal can be processed to assist in determining if the stock of a product within the retail store is depleted. The communications unit 20 can also include a microphone 24 configured to generate an audio signal that corresponds to sound generated by and/or proximate to the consumer. The audio signal can be processed in some embodiments of the present disclosure to allow the consumer to assist in determining if the stock of a product within the retail store is depleted. For example, verbal signals can be processed by the commerce server 12 such as "out of this product."

The communications unit 20 can also include a processor 26 operable to receive signals generated by the other components of the communications unit 20. The processor can also be operable to control the other components of the communications unit 20 and also to process signals received by the head mount unit 14.

The communications unit 20 can also include a transmitter 28 configured to transmit signals generated by the other components of the communications unit 20 from the head mountable unit 14. The communications unit 20 can also include a compass sensor 40 configured to generate a direction signal that is indicative of the direction that the consumer is facing. The direction signal can be processed to assist in determining the identity of a product for which stock is depleted.

The communications unit 20 can also include a GPS or indoor positioning sensor 42 configured to generate a position signal indicative of the position of the consumer. The position signal can be processed to assist in determining one or more products that are proximate to the consumer. The communications unit 20 can also include a receiver 50 configured to receive signals and direct received signals to the processor 26 for further processing. The communications unit 20 can also include a display 52 configured to display text, graphics, images, illustrations and any other video signals to the consumer.

The communications unit 20 can also include a speaker 54 configured to emit sounds, messages, information, and any other audio signal to the consumer. The communications unit 20 can also include an orientation sensor 56 configured to generate an orientation signal indicative of the orientation of the consumer's head, such as the extent to which the consumer is looking downward, upward, or parallel to the ground. A gyroscope can be a component of the orientation sensor 56. The orientation signal can be processed to assist in determining the identity of a product for which stock is depleted.

The camera 22 is operable to capture single images and/or video and to generate a video signal based thereon. The video signal can correspond to the field of view of the consumer wearing the head mountable unit 14. The microphone 24 (shown in phantom) is operable to capture audio data and generate an audio signal based thereon. The audio signal can correspond to sounds that are proximate to the consumer, including the voice of the consumer wearing the head mountable unit 14.

The processor 26 is operable to receive the video signal from the camera 22 and the audio signal from the microphone 24. While one processor 26 is illustrated, it should be appreciated that the term "processor" can include two or more processors that operate in an individual or distributed manner. The transmitter 28 can be an electrical communication element within the processor 26. In one example, the processor 26 is operable to direct the video and audio signals to the transmitter 28 and the transmitter 28 is operable to transmit the video signal and/or audio signal from the head mountable unit 14, such as to the commerce server 12 through the network 16.

The compass sensor 40 can be configured to sense the direction of the consumer, such as the direction that the consumer wearing the head mountable unit 14 is facing. The compass sensor 40 can electrically communicate a direction signal containing orientation data to the processor 26 and the processor 26 can control the transmitter 28 to transmit the direction signal to the commerce server 12 through the network 16. The direction of the consumer can also be calculated from GPS readings and accelerometer.

The GPS sensor 42 can be configured to detect an absolute or relative position of the consumer wearing the head mountable unit 14. The GPS sensor 42 can electrically communicate a position signal containing position data to the processor 26 and the processor 26 can control the transmitter 28 to transmit the position signal to the commerce server 12 through the network 16.

The receiver 50 can be operable to receive transmissions from the network and then communicate the transmissions to the processor 26. The receiver 50 can be an electrical communication element within the processor 26. In some embodiments of the present disclosure, the receiver 50 and the transmitter 28 can be an integral unit.

The display 52 can be positioned within the consumer's field of view. Video content can be shown to the consumer with the display 52. The display 52 can be a transparent when not in use and partially transparent when in use to minimize the obstruction of the consumer's field of view through the display 52.

The speaker 54 can be positioned within the consumer's range of hearing. Audio content transmitted by the commerce server 12 can be played for the consumer through the speaker 54. The receiver 50 can receive the audio signal from the commerce server 12 and direct the audio signal to the processor 26. The processor 26 can then control the speaker 54 to emit the audio content.

The orientation sensor 56 can be a sensor that is operable to detect the orientation of the head mountable unit 14 and thus also detect the orientation of the consumer's head and field of view. The orientation sensor 42 can generate the orientation signal in response to the orientation that is detected and communicate the orientation signal to the processor 26. The orientation of the consumer's head can indicate whether the consumer is viewing a low shelf, a high shelf, or a middle shelf. Also, it is noted that orientation can be calculated from various inputs such as GPS, accelerometer, gyroscope, and/or video inputs.

Figure 3:
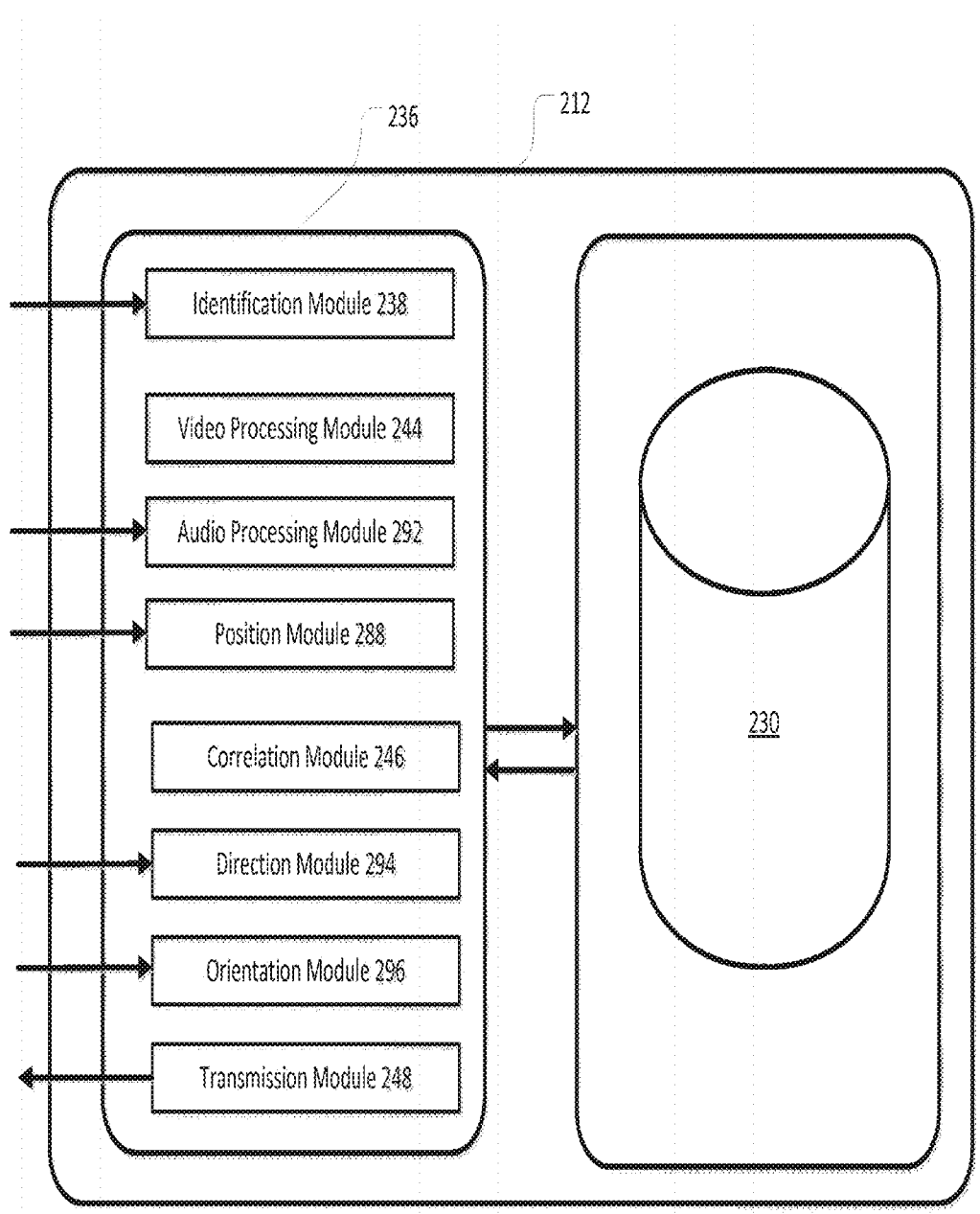
FIG. 3 is an example block diagram illustration a commerce server that can be applied in some embodiments of the present disclosure.

FIG. 3 is a block diagram illustrating a commerce server 212 according to some embodiments of the present disclosure. In the illustrated embodiment, the commerce server 212 can include a product database 230. The commerce server 212 can also include a processing device 236 configured to include an identification module 238, a video processing module 244, a correlation module 246, a transmission module 248, a position module 288, an audio processing module 292, a direction module 294, and an orientation module 296.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The product database 230 can include memory containing the identities of a plurality of products. The plurality of products can be the products offered for sale in a retail store associated with the commerce server 212. The product database 230 can also contain a floor plan of the retail store, including the location of each of the plurality of products within the retail store. The data in the product database 230 can be organized based on one or more tables that may utilize one or more algorithms and/or indexes.

The processing device 236 can communicate with the product database 230 and receive one or more signals from the head mountable unit 14. The processing device 236 can include computer readable memory storing computer readable instructions and one or more processors executing the computer readable instructions.

The identification module 238 can be operable to receive the one or more signals from the head mountable unit 14 that contain an indication of depleted stock. In some embodiments, the identification module 238 can receive a video signal from the camera 22 of the head mountable unit 14. The processing device 236 can also include a video processing module 244 operable to function cooperatively with the identification module 238 and analyze the video signal received from the head mountable unit 14. The video processing module 244 analyze the video signal for any indication that the stock of a product is depleted. The video processing module 244 can implement known video recognition/analysis techniques and algorithms to identify a white space. A white space can be defined when a shelf is empty or partially empty. The identification module 238 can assess the analysis of the video signal by the video processing module and determine if a depletion of stock exists.

The processing device 236 can also include a transmission module 248 operable to transmit a restock signal to the restock facility 25. The restock signal is a communication that a store shelf 15 should be replenished. In some embodiments, the restock facility 25 can be a warehouse operated by employees of the retail store. The employees can receive the signal and transfer a quantity of the product that is depleted on the sales floor from the restock facility 25 to the shelving 15.

In some embodiments, the processing device 236 can also include a correlation module 246 operable to correlate the data in the video signal with a specific product or a set of products in the product database 230. In some embodiments, the video processing module 244 can process the video signal to identify a bar code or a quick response code that might identify the specific product that is depleted. A bar code can be applied by the correlation module 246 in searching the product database 230. The identity of the product that is depleted can be included in the restock signal.

In some embodiments, the processing device 236 can also include a position module 288. The position module 288 can be operable to function cooperatively with the correlation module 246 to identify the product that is depleted on the sales floor of the retail store. The position module 288 can receive the position signal from the head mountable unit 14. The position signal can be generated by the GPS sensor 42 and contain data corresponding to a location of the head mountable unit 14 in the retail store. The position of the consumer can be a factor applied to narrow the set of possible products that is depleted. The correlation module 246 can search the product database 230 based on the position communicated by the position module 288. The correlation module 246 can reject products that are not proximate to the consumer. Proximate products can be products immediately in front of the consumer or, products within the field of view of the consumer. Products outside of this range can be dismissed by the correlation module 246. For example, products that are in adjacent aisles or further away can be dismissed by the correlation module 246.

In some embodiments, the processing device 236 can also include a direction module 294. The direction module 294 can be operable to function cooperatively with the correlation module 246 to identify the product that is depleted on the sales floor of the retail store. The direction module 294 can receive the direction signal from the head mountable unit 14. The direction signal can be generated by the compass sensor 40 and contain data corresponding to a direction of the head mountable unit 14 in the retail store. The direction of the consumer can be a factor applied to narrow the set of possible products that contains the depleted product. The correlation module 246 can search the product database 230 based on the direction communicated by the direction module 294. The correlation module 246 can reject products that are not in the forward direction of the consumer as being the depleted product.

In some embodiments, the processing device 236 can also include an orientation module 296. The orientation module 296 can be operable to function cooperatively with the correlation module 246 to identify the product that is depleted on the sales floor of the retail store. The orientation module 296 can receive the orientation signal from the head mountable unit 14. The orientation signal can be generated by the orientation sensor 40 and contain data corresponding to an orientation of the head mountable unit 14 in the retail store. For example, the orientation of the head mountable unit can be tilted low when the consumer is looking at a low shelf, tilted high when the consumer is looking at a high shelf, or level when the consumer is looking at a middle shelf. The orientation of the consumer can be a factor applied to narrow the set of possible products that contains the depleted product. The correlation module 246 can search the product database 230 based on the orientation communicated by the orientation module 296. The correlation module 246 can reject products that are not on the shelf level indicated by the orientation of the consumer's head. The orientation, direction, and position signals can be received consecutively or concurrently by the processing device 236.

The processing device 236 can include an audio processing module 292. The microphone 24 of the head mountable unit 14 can receive audio signals that can then be transmitted to the processing device 236. The audio processing module 292 can implement known speech recognition techniques to identify speech in the audio signal, such as a voice message indicating that the consumer has encountered a depleted product. The audio processing module 292 can be operable to function cooperatively with the identification module 238 to identify the product that is depleted on the sales floor of the retail store. The analysis of the video signal can be supplemented with the analysis of the audio signal. For example, the identification module 238 can be operable to identify the existence of a depleted product in response to an audio signal received from the consumer even if the analysis of the video signal is inconclusive.

Figure 4A:
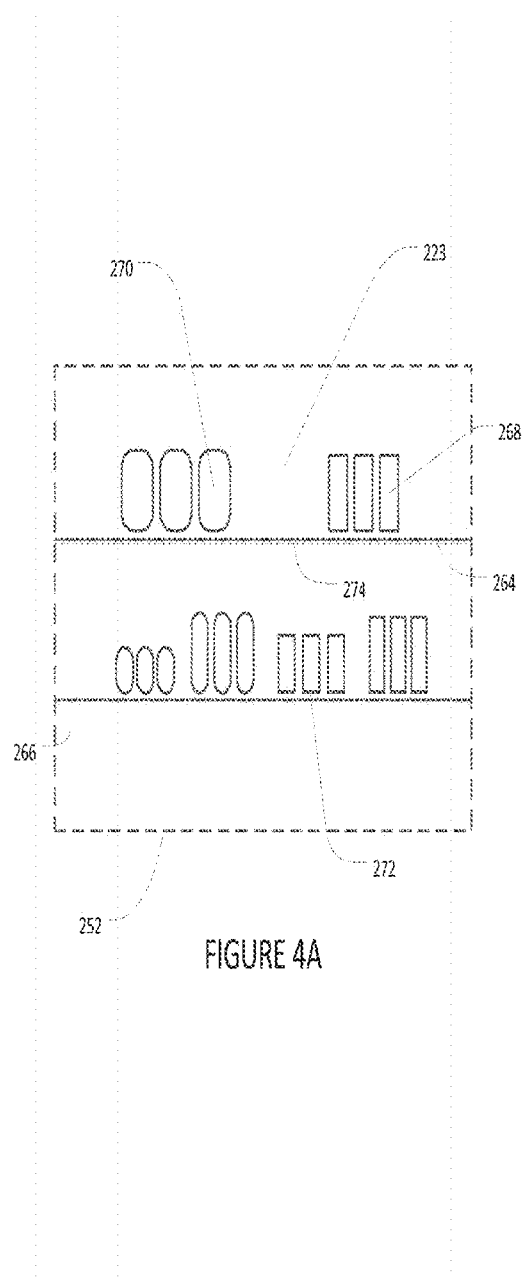
FIG. 4A is an example screen shot of the display visible with the head mountable unit during shopping in some embodiments of the present disclosure.
Figure 4B:
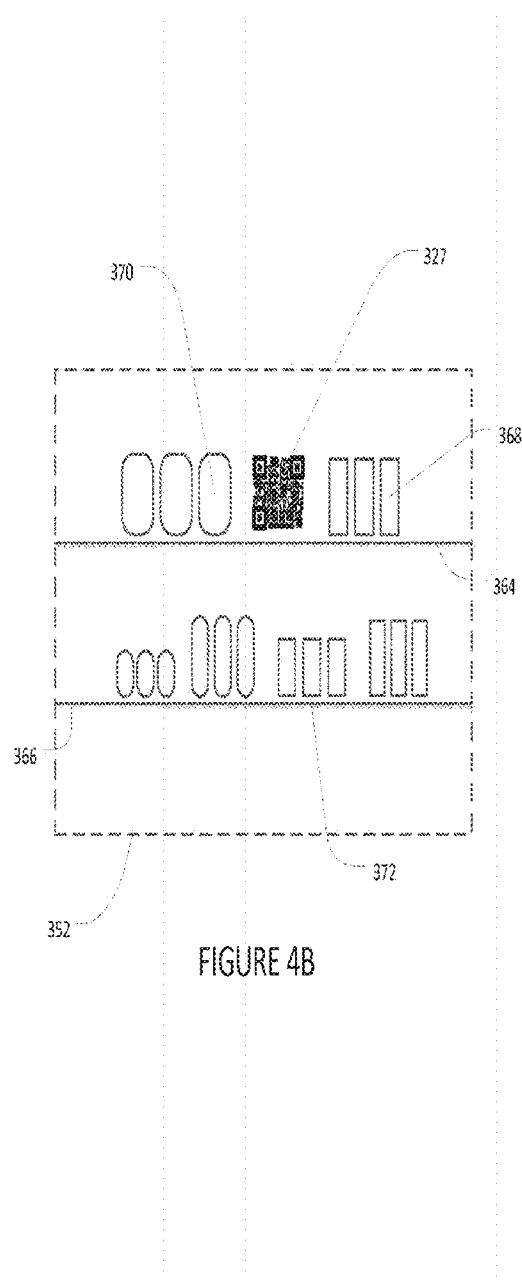
FIG. 4B is another example screen shot of the display visible with the head mountable unit during shopping in some embodiments of the present disclosure.

FIGS. 4A-4B illustrates views that can be perceived by the consumer and by the video processing module 244 in some embodiments of the present disclosure. The camera 22 and display 52 of the head mountable unit 14 can be generally aligned such that the display 52 overlaps the field of view of the camera 22. In other words, the camera 22 is arranged so that the video signal received by the commerce server 212 is substantially similar to the field of view through the display 52 for the consumer wearing the head mountable unit 14.

FIG. 4A is a screen shot of a field of view that can be visible to the consumer and also received as a video signal by the video processing module 244. The screen shot can fill the display 252 or can be a portion of the display 252. The consumer can be looking through at least part of the display 252 and viewing products, such as products 268, 270, 272, supported on shelves 264, 266. The video processing module 244 can identify a white space 223 in the video signal corresponding to FIG. 4A. In some embodiments, a white space 223 can be recognized based a size of the gap between adjacent products.

In some embodiments of the present disclosure, the identification module 238 can determine a depletion of stock exists in response to both the existence of a white space and the placement of the white space above a bar code. In FIG. 4A, the position of a bar code is referenced at 274. The identification module 238 in some embodiments of the present disclosure could identify a depletion of stock only if the space above a bar code is white space.

FIG. 4B is a screen shot of a field of view that can be visible to the consumer and also received as a video signal by the video processing module 244. The screen shot can fill the display 352 or can be a portion of the display 352. The consumer can be looking through at least part of the display 352 and viewing products, such as products 368, 370, 372, supported on shelves 364, 366. The video processing module 244 can identify a quick response code 327 in the video signal corresponding to FIG. 4B. In some embodiments, a quick response code 327 can be positioned on the rear wall 321 of shelving. A unique quick response code 327 can be positioned behind each product for sale. When the shelf 364 is fully stocked, the quick response code 327 can be hidden. In an embodiment such as shown in FIG. 4B, the quick response code 327 can both identify the existence of a depletion of stock and identify the depleted product.

In some embodiments, a two-dimensional barcode (such as a QR code) 327 can be positioned behind all products in the retail store. In these embodiments, the two-dimensional barcode 327 can merely identify the existence of a depletion of stock.

Figure 4C:
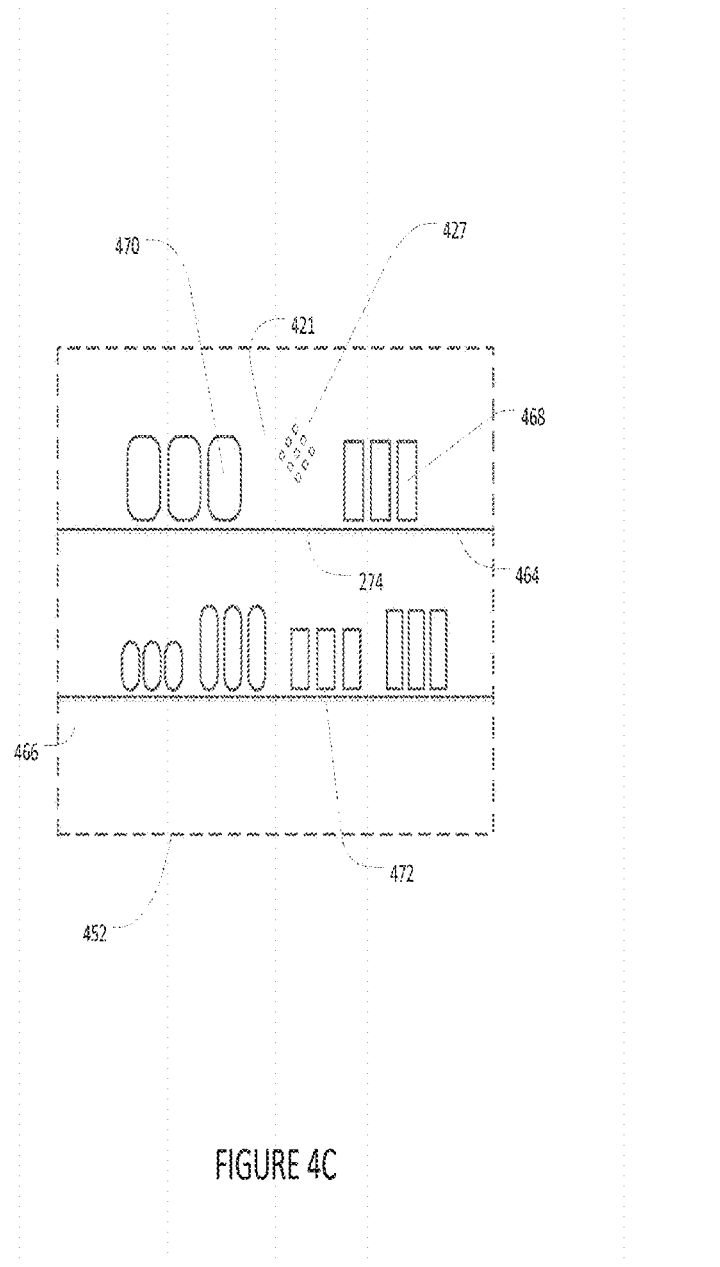
FIG. 4C is another example screen shot of the display visible with the head mountable unit during shopping in some embodiments of the present disclosure.

FIG. 4C is a screen shot of a field of view that can be visible to the consumer and also received as a video signal by the video processing module 244. The screen shot can fill the display 452 or can be a portion of the display 452. The consumer can be looking through at least part of the display 452 and viewing products, such as products 468, 470, 472, supported on shelves 464, 466. The video processing module 444 can identify a pattern 427 other than white space in the video signal corresponding to FIG. 4B. The pattern 427 can be defined by the rear wall 421 of the shelves 464, 466. When the shelf 464 is fully stocked, the pattern 427 can be hidden. It is noted that only portion of the pattern 427 is illustrated; the pattern 427 can be defined along the full width and height of the rear wall 421.

It is noted that the various processing functions set forth above can be executed differently than described above in order to enhance the efficiency of an embodiment of the present disclosure in a particular operating environment. The processor 40 can assume a greater role in processing some of the signals in some embodiments of the invention. For example, in some embodiments, the processor 40 on the head mountable unit 14 could modify the video stream to require less bandwidth. The processor 40 could convert a video signal containing color to black and white in order to reduce the bandwidth required for transmitting the video signal. In some embodiments, the processor 40 could crop the video, or sample the video and display frames of interest. A frame of interest could be a frame that is significantly different from other frames, such as a generally low quality video having an occasional high quality frame. Thus, in some embodiments, the processor 40 could selectively extract video or data of interest from a video signal containing data of interest and other data. Further, the processor 40 could process audio signals received through the microphone 44, such signals corresponding to audible commands from the consumer.

Figure 5:
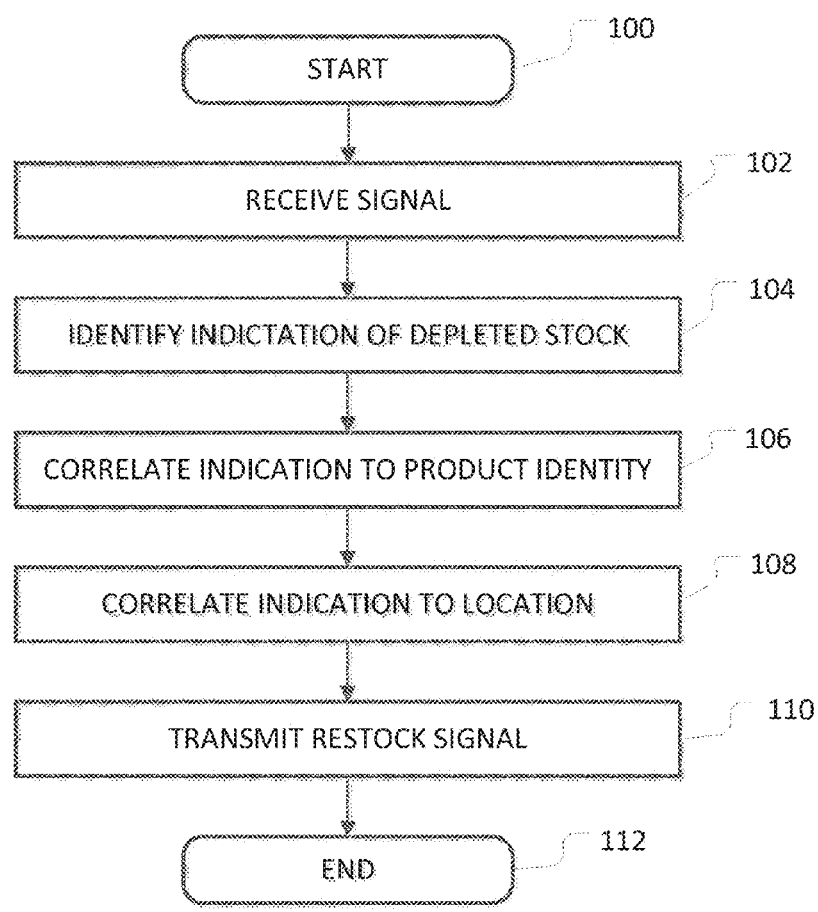
FIG. 5 is an example flow chart illustrating a method that can be carried out according to some embodiments of the present disclosure.

FIG. 5 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

FIG. 5 is a flow chart illustrating a method that can be carried out in some embodiments of the present disclosure. The method can be executed by a commerce server. The commerce server can be located at the retail store or can be remote from the retail store. The method starts at step 100. At step 102, the commerce server can receive a signal. The signal can be indicative of depleted stock of a product in a retail store.

At step 104, the video signal is processed to identify an indication of depleted stock. At operation 106, the identified depletion of stock is correlated to a product identity. Operation 106 is optional to some embodiments of the invention. The identification of a depletion of stock can prompt a restock facility to investigate a general location of the depletion without knowing the precise product that is depleted.

At operation 108, the identified depletion of stock is correlated to a location in the retail store. Operation 108 is optional to some embodiments of the invention. The identification of a depletion of stock can include an identification of the product. For example, in some embodiments of the present disclosure, a bar code can be visible in the video signal. The bar code can reveal the identity of the product that is depleted. In some embodiments, the restock facility can access the product database and identify the location of the product requiring replenishment. At step 110, the restock signal can be transmitted and the exemplary method ends at step 112.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A system comprising:
    a processing device operable to receive a video signal from a communications unit associated with a user as the user traverses an environment stocked with a plurality of products;
    a memory operably connected to the processing device;
    an identification module stored on the memory and being configured to modify operation of the processing device to:
        detect a white space within the video signal, the white space being indicative that one of the plurality of products is depleted;
        detect a bar code proximate the white space within the video signal; and
        determine that the one of the plurality of products is depleted in response to the detection of the white space and the detection of the bar code proximate the white space;
    and
    a transmission module coupled to the processing device and the identification module and being configured to transmit a restock signal in response to the depletion of the one of the plurality of products.

2. The system, as set forth in claim 1, wherein the communications unit is coupled to a head mountable unit worn by the user.

3. The system, as set forth in claim 1, further comprising a correlation module coupled to the identification module and configured to correlate the video signal with a set of products stored in a product database to identify the one of the plurality of products.

4. The system, as set forth in claim 3, further comprising a video processing module coupled to the identification module and the correlation module and being configured to detect a geometric figure located within the environment and located adjacent the one of the plurality of products, the correlation module being configured to identify the one of the products plurality of products as a function of the geometric figure and the product database.

5. The system, as set forth in claim 3, further comprising a position module coupled to the identification module and the correlation module and being configured to determine a position of the communications unit within the environment, the correlation module being configured to identify the one of the plurality of products as a function of the determined position and the product database.

6. The system, as set forth in claim 5, further comprising a direction module coupled to the identification module and the correlation module and being configured to determine a direction associated with the communications unit, the correlation module being configured to narrow a set of possible products that may include the one of the plurality of products as a function of the determined direction.

7. The system, as set forth in claim 3, wherein a geometric figure is the bar code.

8. The system, as set forth in claim 7, wherein the bar code is encoded with an identity of the one of the plurality of product.

9. The system, as set forth in claim 8, wherein the transmission module is further configured to transmit the identity of the one of the plurality of products as part of the restock signal.

10. A method, comprising:
    receiving, at a processing device, a video signal from a communications unit associated with a user as the user traverses an environment stocked with a plurality of products;
    providing a memory connected to the processing device;
    modifying operation of the processing device, by an identification module stored in the memory connected to the processing device, to:
        detect a white space within the video signal, the white space being indicative that one of the plurality of products is depleted;
        detect a bar code proximate the white space within the video signal; and
        determine that the one of the plurality of products is depleted in response to the detection of the white space and the detection of the bar code proximate the white space;
    and
    transmitting, using a transmission module coupled to the processing device and the identification module, a restock signal in response to the depletion of the one of the plurality of products.

11. The method, as set forth in claim 10, wherein the communications unit is coupled to a head mountable unit worn by the user.

12. The method, as set forth in claim 10, further comprising a step of correlating, by a correlation module coupled to the identification module, the video signal with a set of products stored in a product database to identify the one of the plurality of products.

13. The method, as set forth in claim 12, further comprising steps of detecting, by a video processing module coupled to the identification module and the correlation module, a geometric figure located within the environment and located adjacent the one of the plurality of products and identifying, by the correlation module, the one of the plurality of products as a function of the geometric figure and the product database.

14. The method, as set forth in claim 12, further comprising steps of determining, by a position module coupled to the identification module and the correlation module, a position of the communications unit within the environment and identifying the one of the plurality of products as a function of the determined position and the product database.

15. The method, as set forth in claim 14, further comprising steps of determining, using a direction module coupled to the identification module and the correlation module, a direction associated with the communications unit and narrowing a set of possible products that may include the one of the plurality of products as a function of the determined direction.

16. The method, as set forth in claim 12, wherein a geometric figure is the bar code.

17. The method, as set forth in claim 16, wherein the bar code is encoded with an identity of the one of the plurality of product.

18. The method, as set forth in claim 17, wherein the identity of the one of the plurality of products is transmitted as part of the restock signal.

19. One or more non-transitory computer-readable storage media, having computer-executable instructions embodied thereon, wherein when executed by at least one processor, the computer-executable instructions cause the at least one processor to operate as:
   a processing device operable to receive a video signal from a communications unit associated with a user as the user traverses an environment stocked with a plurality of products;
   a memory operably connected to the processing device;
   an identification module stored on the memory and being configured to modify operation of the processing device to:
      detect a white space within the video signal, the white space being indicative that one of the plurality of products is depleted;
      detect a bar code proximate the white space within the video signal; and
      determine that the one of the plurality of products is depleted in response to the detection of the white space and the detection of the bar code proximate the white space;
   and
   a transmission module coupled to the processing device and the identification module and being configured to transmit a restock signal in response to the depletion of the one of the plurality of products.

* * * * *